April 7, 1931.  O. LEE  1,800,147
TIRE CHAIN ADJUSTER
Filed March 18, 1930
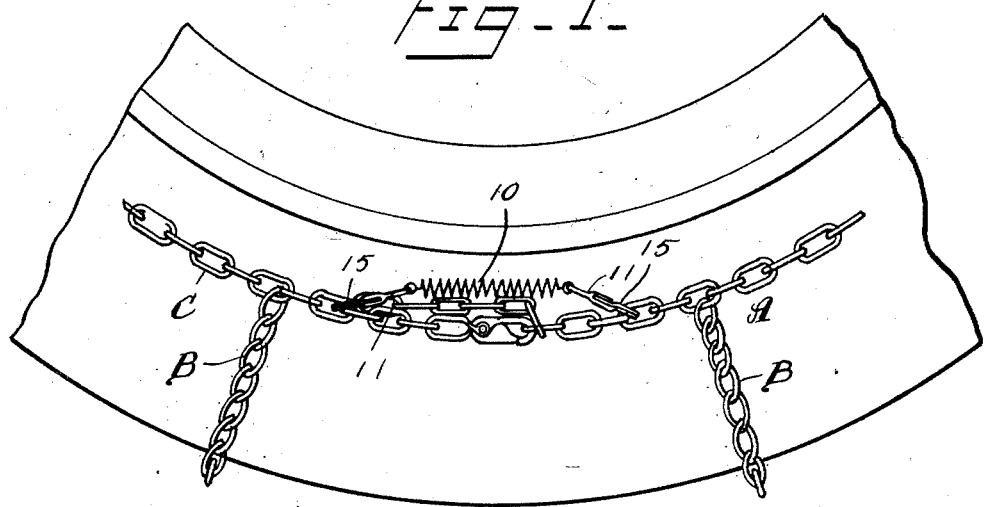
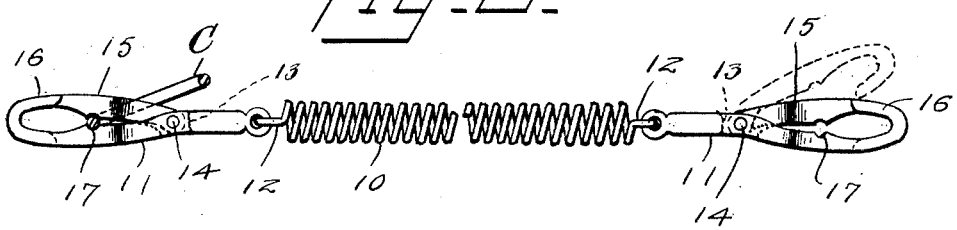
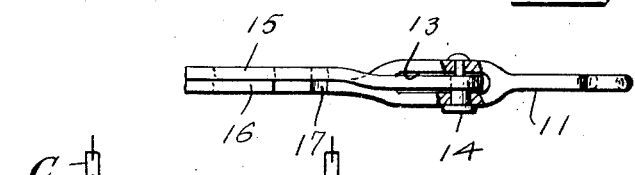
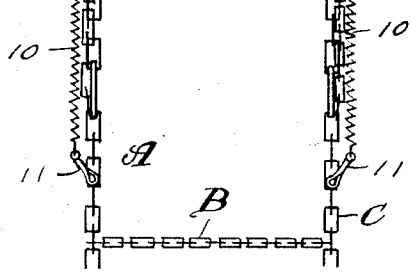
Inventor
Oscar Lee
By Watson E. Coleman
Attorney Patented Apr. 7, 1931

1,800,147

UNITED STATES PATENT OFFICE

OSCAR LEE, OF FAIRFIELD, MONTANA, ASSIGNOR OF ONE-HALF TO HAROLD P. WANGEN, OF FAIRFIELD, MONTANA

TIRE-CHAIN ADJUSTER

Application filed March 18, 1930. Serial No. 436,773.

This invention relates to means for exerting a constant strain on tire chains for the purpose of holding them relatively tightly on the wheel and holding them in adjusted position and means for this purpose which I have devised includes a tension spring with pairs of hooks at opposite ends of the tension spring constructed in a peculiar manner, these opposite hooks being adapted to engage links of the tire chain, and the spring acting to keep a more or less constant tension on the tire chains, thus keeping the tire chains tight and preventing them from flopping.

Another object is to provide a device of this character which will keep the chains even on both sides of the tire and will prevent the inside part of the chain from being pulled up over the top of the casing.

Another object is to so construct hooks that the tension of the heavy spring will not let them come open when the hooks are engaged with the links of the tire chain.

My invention is illustrated in the accompanying drawing, wherein:—

Figure 1 is a fragmentary side elevation of an automobile tire showing my device applied to one side thereof;

Figure 2 is an elevation of the chain adjusting device;

Figure 3 is a top plan view of one pair of hook shanks, one of the hook shanks partly broken away to show the pivotal connection of the other hook shank.

Figure 4 is a diagrammatic fragmentary plan view showing how my tightener devices are applied to the two circumferential side chains of the set of tire chains.

Referring to this drawing, A designates an ordinary tire chain having the cross chains B and the longitudinal chains C of any usual or suitable construction. These longitudinal chains C terminate in hooks $c$ whereby the ends of the chains may be engaged with each other. My device for adjusting these tire chains and holding them in adjusted position upon the wheel comprises a relatively strong coiled contractile spring 10. With each end of this spring is engaged a hook shank 11, the inner end of the hook shank being formed with an eye through which a loop 12 on the end of the spring engages. The hook shank 11 is formed with a recess or opening 13 through which passes a shouldered rivet 14. This rivet passes through the extremity of a hook shank 15 which is shorter than the shank 11 and the hook shanks 11 and 15 are both provided with bills 16. Inward of the bills, each of the shanks 11 and 15 is formed with a notch 17. The shank of the hook 15 is slightly offset as seen in Figure 2 so as to clear the hook shank 11. Both ends of the spring 10 are formed with these connected shanks 11 and 15 so that each end of the spring is formed with the double hook.

In the use of this device, the chain A is placed around the tire and the end links of the chains C are connected by the hooks $c$ in the usual manner. If the tire is relatively small in diameter, there will be a number of links beyond the connection of the hook $c$ forming the loose ends of the chains C.

There are two of my devices used, one on the outside of the tires and one on the inside. The hooks on one end of the spring 10 are engaged with one of the links of the chain C on that side and then the spring is placed under slight tension and the hooks on the opposite end of the tension spring 10 are engaged with a link. The links with which the opposite hooks are engaged are just sufficiently far apart as to place a definite tension on the spring 10, this tension being such as to draw the chain A snugly around the tire. As before stated, one of my devices is applied to the inside chain C and the other to the outside chain C so that the slackness in both chains is equally taken up. The loose ends of the chains C may be connected with the respective hooks at one end or the other of the springs 10 in an obvious manner. It will be seen from Figure 1 that the bills 16 on the two hooks overlap so that when they are engaged with a link, the link, as shown in Figure 1, will be disposed between these hooks and within the bills thereof so that the hooks cannot open so long as tension is placed upon the hooks by the springs 10.

This type of chain adjuster which I have described will keep the tire chains tight and prevent the chains from flopping and will also keep the chains even on both sides of the tire. Most of the tire chain adjusters now in use are fastened to the chain on the outside of the tire and in case the chain is a little loose, the inside part of the chain is often pulled up over the casing.

I claim:—

1. The combination with a tire chain having circumferentially extending parallel side chains and hooks on the ends of said side chains, of an adjuster comprising a pair of relatively straight coiled springs, disposed one on each side of the side chains, each coiled spring at its opposite ends being formed with a pair of pivoted hooks having returned bills engaged with the links of the side chains, and a spring exerting a substantially circumferential pull on the side chains in substantially the direction of length of the side chains, the confronting edge faces of the hooks having coacting notches within which the link of the loose end of the tire chain may be disposed when the hooks are closed and engaged with the links of the side chains.

2. A tire chain tightener and adjuster of the character described, comprising a coiled contractile spring, a hook shank engaged with each end of the spring, the hook shank being formed at its end with a returned bill and intermediate its end with an aperture, a second hook shank pivotally engaged with the shank of each first-named hook shank and having a returned bill, the bills being adapted to overlap when the hook shanks are in closed position, the confronting edges of the shanks of one of said pairs of hooks being formed with opposed notches within which the link of the loose end of a tire chain may be disposed and held when the bills of the hooks are overlapped.

In testimony whereof I hereunto affix my signature.

OSCAR LEE.